United States Patent
Fried et al.

(10) Patent No.: US 8,791,360 B2
(45) Date of Patent: Jul. 29, 2014

(54) ELECTRICAL CONNECTION OF A SEALED ELECTRICAL MACHINE AND METHOD FOR COOLING AN ELECTRICAL CONNECTION OF A SEALED ELECTRICAL MACHINE

(75) Inventors: Not-Curdin Fried, Windisch (CH);
Daniel Hediger, Othmarsingen (CH);
Andrzej Klopotowski, Wroclaw (PL)

(73) Assignee: Alstom Technology Ltd, Baden (CH)

( * ) Notice: Subject to any disclaimer, the term of this patent is extended or adjusted under 35 U.S.C. 154(b) by 238 days.

(21) Appl. No.: 12/818,284

(22) Filed: Jun. 18, 2010

(65) Prior Publication Data
US 2010/0319949 A1 Dec. 23, 2010

(30) Foreign Application Priority Data
Jun. 22, 2009 (EP) .................................. 09163336

(51) Int. Cl.
*H01B 17/26* (2006.01)
*H01B 17/54* (2006.01)

(52) U.S. Cl.
USPC .............................. 174/15.3; 310/52; 310/61

(58) Field of Classification Search
USPC ....................................................... 174/15.3
See application file for complete search history.

(56) References Cited

U.S. PATENT DOCUMENTS

| 1,706,810 | A | | 3/1929 | Paul |
| 2,742,583 | A | | 4/1956 | Beckwith |
| 2,828,428 | A | * | 3/1958 | Baudry et al. ................. 310/64 |
| 4,169,965 | A | * | 10/1979 | Cronin ......................... 174/15.3 |
| 7,961,466 | B2 | * | 6/2011 | Eriksson ...................... 361/699 |

FOREIGN PATENT DOCUMENTS

| CH | 328574 A | 3/1958 |
| DE | 1046171 B | 12/1958 |
| GB | 725211 A | 3/1955 |
| GB | 754175 A | 8/1956 |
| GB | 775109 A | 5/1957 |

* cited by examiner

*Primary Examiner* — Jayprakash N Gandhi
*Assistant Examiner* — Dion Ferguson
(74) *Attorney, Agent, or Firm* — Buchanan Ingersoll & Rooney PC

(57) ABSTRACT

The electrical connection of a sealed electrical machine is provided and includes a casing containing lead conductors each connected to a bushing via an electrical connector. The casing has at least an inlet and an outlet for a cooling fluid. The electrical connector includes at least a permeable element defining a chamber such that during operation the cooling fluid, passing through the chamber and the permeable element, cools the permeable element. A method is also provided for cooling an electrical connection.

17 Claims, 4 Drawing Sheets

ELECTRICAL CONNECTION OF A SEALED ELECTRICAL MACHINE AND METHOD FOR COOLING AN ELECTRICAL CONNECTION OF A SEALED ELECTRICAL MACHINE

FIELD OF INVENTION

The present invention relates to electrical connection of a sealed electrical machine and a method for cooling an electrical connection of a sealed electrical machine.

In particular the electrical machine of the invention is an electric generator, and the electrical connection connects the winding or phases of the electric generator to the outside (for example a transformer or an electric line).

BACKGROUND

As known in the art, generators are provided with a stator and a rotor connected to a motor (such as a steam or a gas turbine) for rotating it within the stator and generating electric power.

The stator is provided with an electric winding (that collects the electric power) that is connected to lead conductors coupled to bushings.

The bushings are typically connected to an electric user or a transformer or an electric line.

In large power electric generators (for example 500 MW or more) during operation a large amount of heat is generated at the connection between the lead conductors and the bushings; such heat must be removed (i.e. the lead conductors and the bushings must be cooled) in order to safeguard the reliability of the generator.

In this respect, lead conductors and bushings are misaligned from one another and are connected each other via metallic clamps.

In addition, the lead conductors and the bushings are tubular in shape and are connected to Teflon pipes carrying a cooling fluid, such that during operation the cooling fluid passes through the Teflon pipes and the lead conductors to cool the lead conductors (it is then fed to the generator stator), and further fluid passes through further Teflon pipes and the bushings to cool the bushing.

Nevertheless this arrangement has some drawbacks.

First of all assembling is very complicated and time consuming, due to the large number of Teflon pipes to be connected (the zone of the generator where the Teflon pipes must be connected is often very small, this increases the difficulty of assembling).

In addition, the Teflon pipes are directly connected to the lead conductors and the bushings, i.e. they are connected to parts of the generator having high tension; this causes the need of a minimum length of the Teflon pipes in order to guarantee a sufficient dielectric strength to avoid electrical discharges.

GB 725,211 discloses a sealed electrical generator having a high pressure chamber housing the stator and the rotor, and a low pressure chamber housing the electrical connection between the lead conductors (connected to the winding of the generator stator) and the bushings.

This generator is provided with a cooling system for the bushings.

The cooling system comprises a duct within each bushing and an injector having an end opened in the high pressure chamber and the other end opened in the low pressure chamber and aligned with the duct of the bushing, but away from it.

During operation the cooling fluid (being the gas filling the sealed generator) enters the injectors in the high pressure chamber and is injected into the ducts of the bushings in the low pressure chamber (thanks to the differential pressure); then the cooling fluid passes through the bushings and cools them.

Nevertheless also this arrangement has some drawbacks.

In fact, cooling is not efficient, since the cooling fluid is injected from an injector and must enter a duct that is away from the same injector.

SUMMARY

The present disclosure is directed to an electrical connection of a sealed electrical machine including a casing having at least a lead conductor connected to a bushing via an electrical connector. The casing includes at least an inlet and an outlet for a cooling fluid. The electrical connector includes at least a permeable element defining a chamber, such that, during operation, the cooling fluid passes through the chamber and the permeable element, thereby cooling the permeable element.

The present disclosure is also directed to a method for cooling electrical connectors of a sealed electrical machine including a casing having at least a lead conductor connected to a bushing via an electrical connector. The casing having at least an inlet and an outlet for a cooling fluid and the electrical connector includes at least a permeable element defining a chamber. The method includes passing the cooling fluid, through the chamber and the permeable element, thereby cooling the permeable element.

BRIEF DESCRIPTION OF THE DRAWINGS

Further characteristics and advantages of the invention will be more apparent from the description of the preferred but non-exclusive embodiments of the electrical connection and method according to the invention, illustrated by way of non-limiting example in the accompanying drawings, in which.

DETAILED DESCRIPTION OF THE PREFERRED EMBODIMENTS

Introduction to the Embodiments

Figure 1:
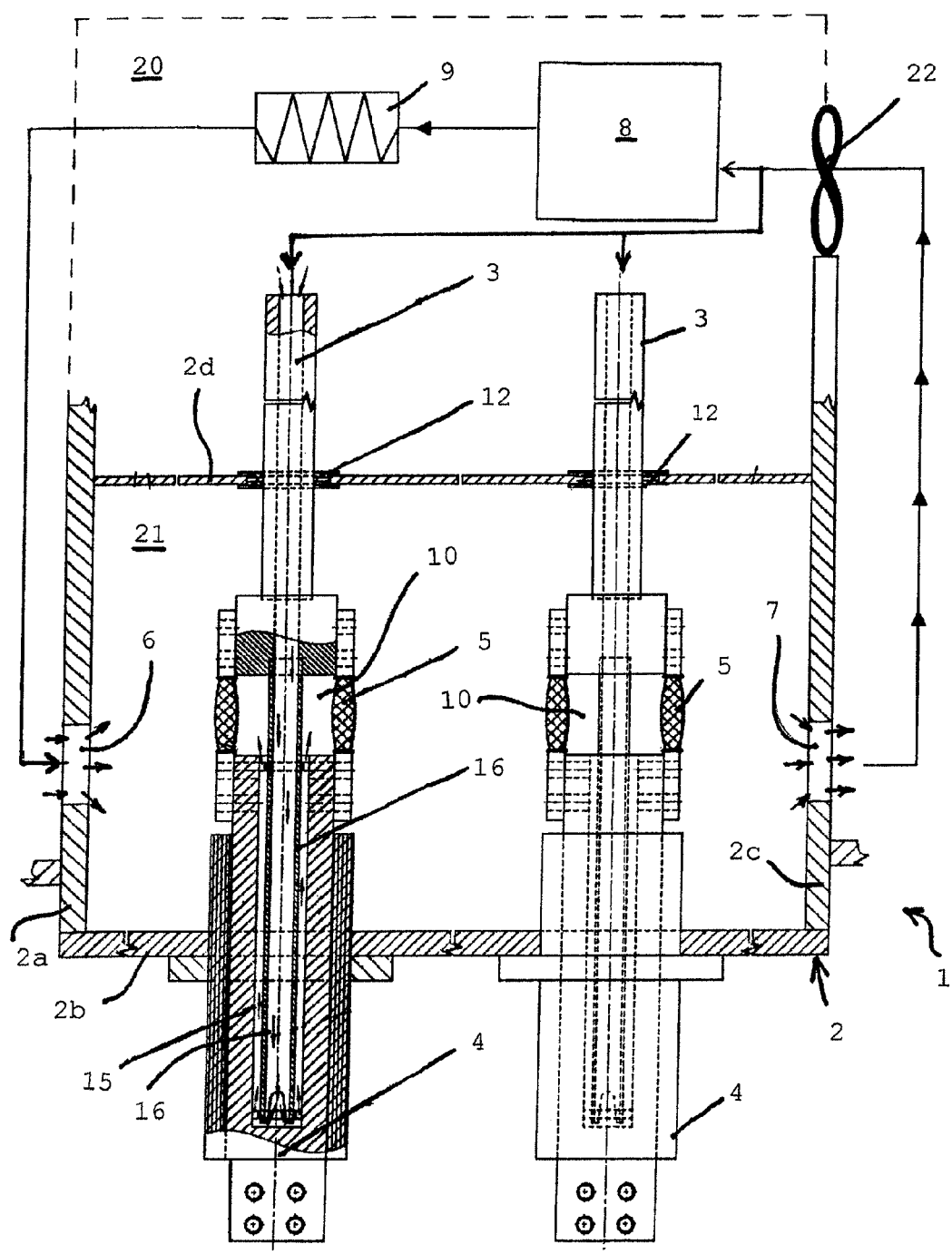
FIG. 1 is a schematic view of a first embodiment of the invention with sequential cooling of the lead conductor and bushing and outer cooling.

The technical aim of the present invention is therefore to provide electrical connectors and a method by which the said problems of the known art are eliminated.

Within the scope of this technical aim, an object of the invention is to provide electrical connectors and a method with which assembling is quick and easy.

Another object of the invention is to provide electrical connectors and a method which let the dielectric strength limitation be overcome.

A further object of the present invention is to provide electrical connectors and a method which let a very efficient cooling be achieved.

The technical aim, together with these and further objects, are attained according to the invention by providing an electrical connectors and a method in accordance with the accompanying claims.

DETAILED DESCRIPTION

With reference to the figures, these show an electrical connection of a sealed electrical machine overall indicated by the reference 1.

The electrical machine is a sealed electric generator that comprises a case defining a high pressure chamber 20 and a low pressure chamber 21 (with one or two fans 22 between the two chambers).

The high pressure chamber 20 houses a stator with the stator winding and a rotor with the rotor winding.

The low pressure chamber 21 houses the electrical connection comprising lead conductors 3 and the bushings 4, with electric connectors 5 provided between them.

Figure 4:
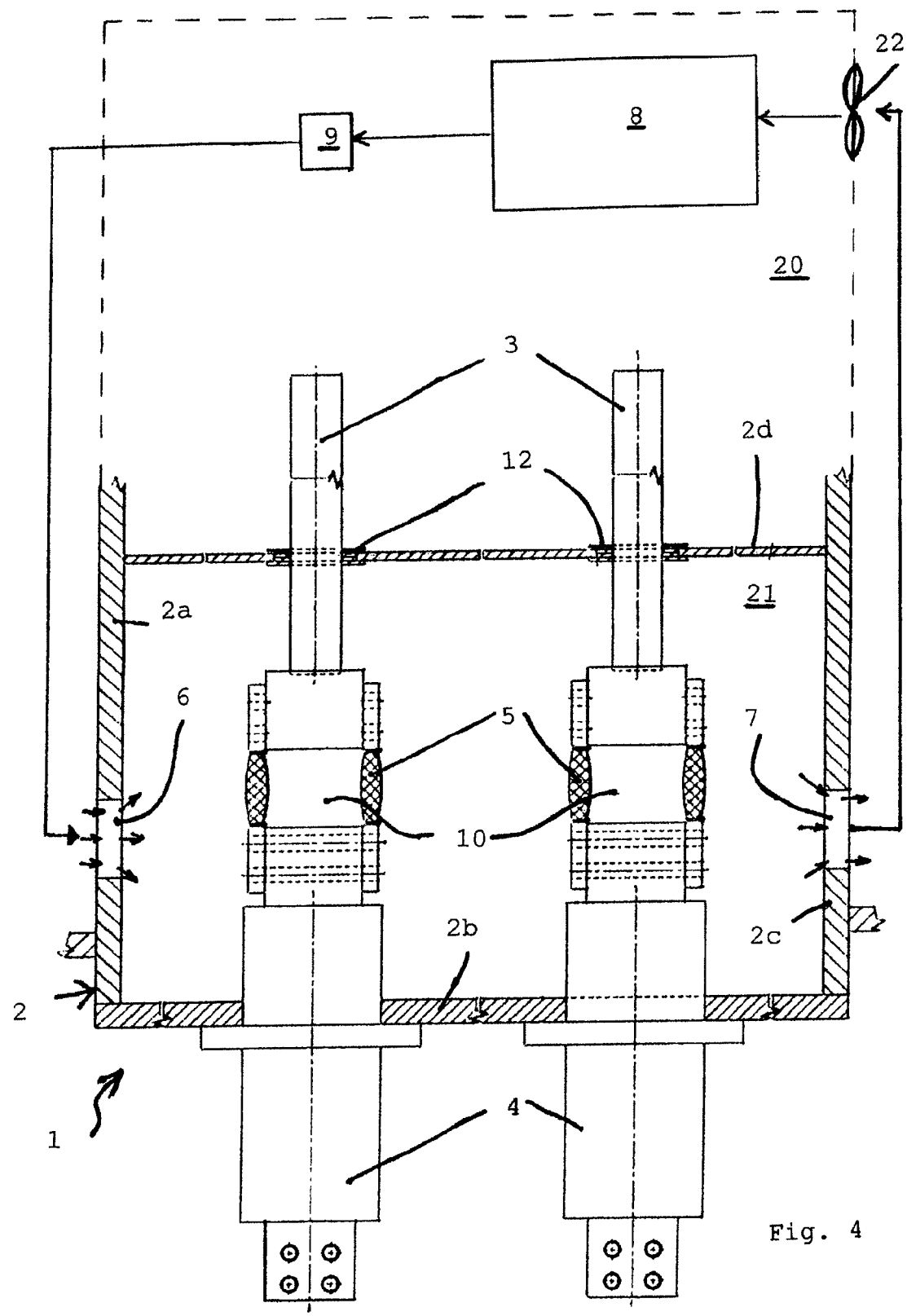
FIG. 4 is a schematic view of a fourth embodiment of the invention with outer cooling.

With particular reference to FIG. 4 (showing the simplest embodiment of the invention) the electrical connection comprises the casing 2, which can optionally be integral with the case 2, containing the lead conductors 3 connected to the bushings 4 via electrical connectors 5.

According to the particular generator, the electrical connection may comprise a different number of groups made of lead conductors 3, bushings 4 and electrical connectors 5.

The casing 2 has an inlet 6 and an outlet 7 for a cooling fluid; the cooling fluid passing through the casing 2 is the gas (usually H2) filling the sealed generator.

The inlet 6 and the outlet 7 are at opposite zones of the casing 2 and are connected to the cooling circuit of the stator 8 of the generator; moreover, they preferably face the electric connectors 5.

In this respect the gas (that circulates within the generator activated by the fan 22) passes through the stator 8 and cools it, passes through a heat exchanger 9 where it is cooled and is then feed into the casing 2 through the inlet 6.

Thus the gas passes through the casing 2 and goes out through the outlet 7, to be fed to the high pressure chamber 20 where is passes through the stator 8 to cool it.

The electrical connector 5 comprises a permeable element defining a chamber 10, such that during operation the gas (cooling fluid) passing through the chamber 10 and the permeable element 5, cools the permeable element 5.

As the cooling fluid passes through the permeable element 5, cooling is very efficient.

The permeable element 5 defines the chamber 10 with the ends of the lead conductor 3 and the end of the bushing 4.

Preferably the permeable element 5 comprises a tubular conductive element provided with a plurality of through apertures.

Moreover, in order to optimize the electrical connection, the tubular conductive element constituting the permeable element 5 overlaps and is connected to the side ends of the lead conductor 3 and bushing 4; this lets a large contact surface be achieved.

The casing 2 has a box like structure with outer walls 2a, 2b, 2c and an inner wall 2d between the high pressure chamber 20 and the low pressure chamber 21.

The wall 2d of the box like casing 2 is provided with through apertures through which the lead conductors 3 pass to enter the casing 2.

Each aperture is provided with a seal 12 arranged to seal the gap between the lead conductors 3 and the casing 2 (i.e. the wall 2d).

The operation of the electrical connection of the invention is apparent from that described and illustrated and is substantially the following.

The gas (cooling fluid) enters the casing 2 through the inlet 6 and (activated by the fan 22) passes through the casing 2 to be discharged through the outlet 7.

When passing through the casing 2 the gas passes through the permeable elements 5 and, in addition, passes over the outer surfaces of the lead conductors 3 and bushings 4 cooling them.

The gas then emerges from the casing 2 through the outlet 7 and is fed to the stator 8 and heat exchanger 9; from the heat exchanger 9 the gas is fed to the casing 2 again.

Figure 3:
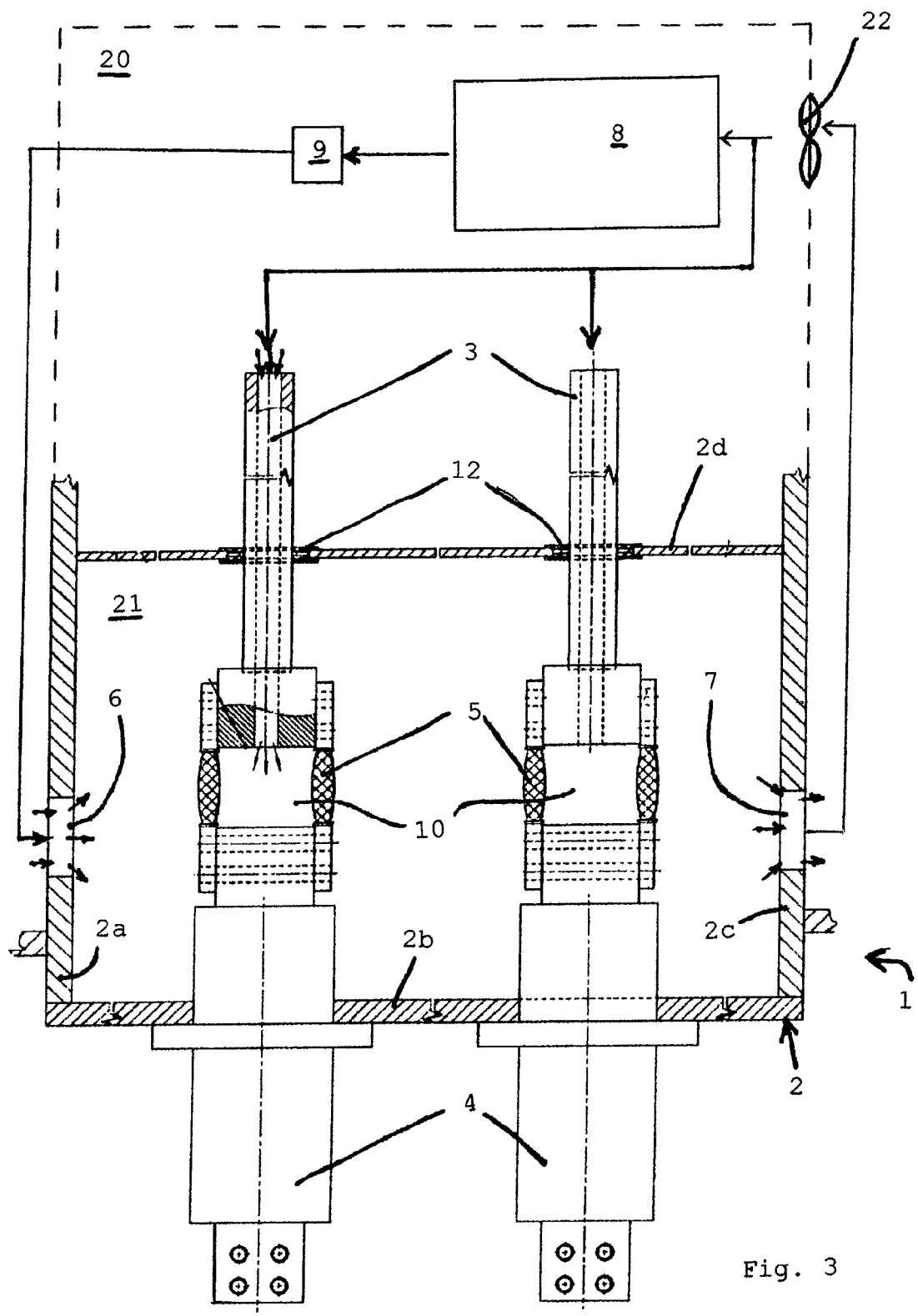
FIG. 3 is a schematic view of a third embodiment of the invention with cooling of the lead conductor and outer cooling.

FIG. 3 shows a different embodiment of the invention.

This embodiment has the same features of the embodiment already described and, in this respect, similar elements are indicated by the same reference numerals.

In addition, the lead conductors 3 have a tubular shape and are arranged to feed a cooling fluid into the chamber 10.

In different embodiments, the lead conductors 3 are fed with the gas (cooling fluid) before it enters and cools the stator 8 or after is has entered and cooled the stator 8 or in intermediate positions of the stator 8 (i.e. the gas is fed to the lead conductors 3 after it has entered and partly cooled the stator 8 but before it has gone out from the stator 8); the enclosed figures show the gas (cooling fluid) fed to the lead connectors 3 before it enters the lead connectors.

The operation of the electrical connection in the embodiment of FIG. 3 is similar to that already described for the embodiment of FIG. 4.

In particular, the cooling fluid passes through the lead conductors 3 cooling them, enters the chambers 10 and passes through the permeable elements 5 cooling them.

In addition, the cooling fluid passing through the casing 2 cools the outer surfaces of the leading conductors 3, the bushings 4 and the permeable element 5 and draws the cooling fluid passing through the permeable element 5 away.

Figure 2:
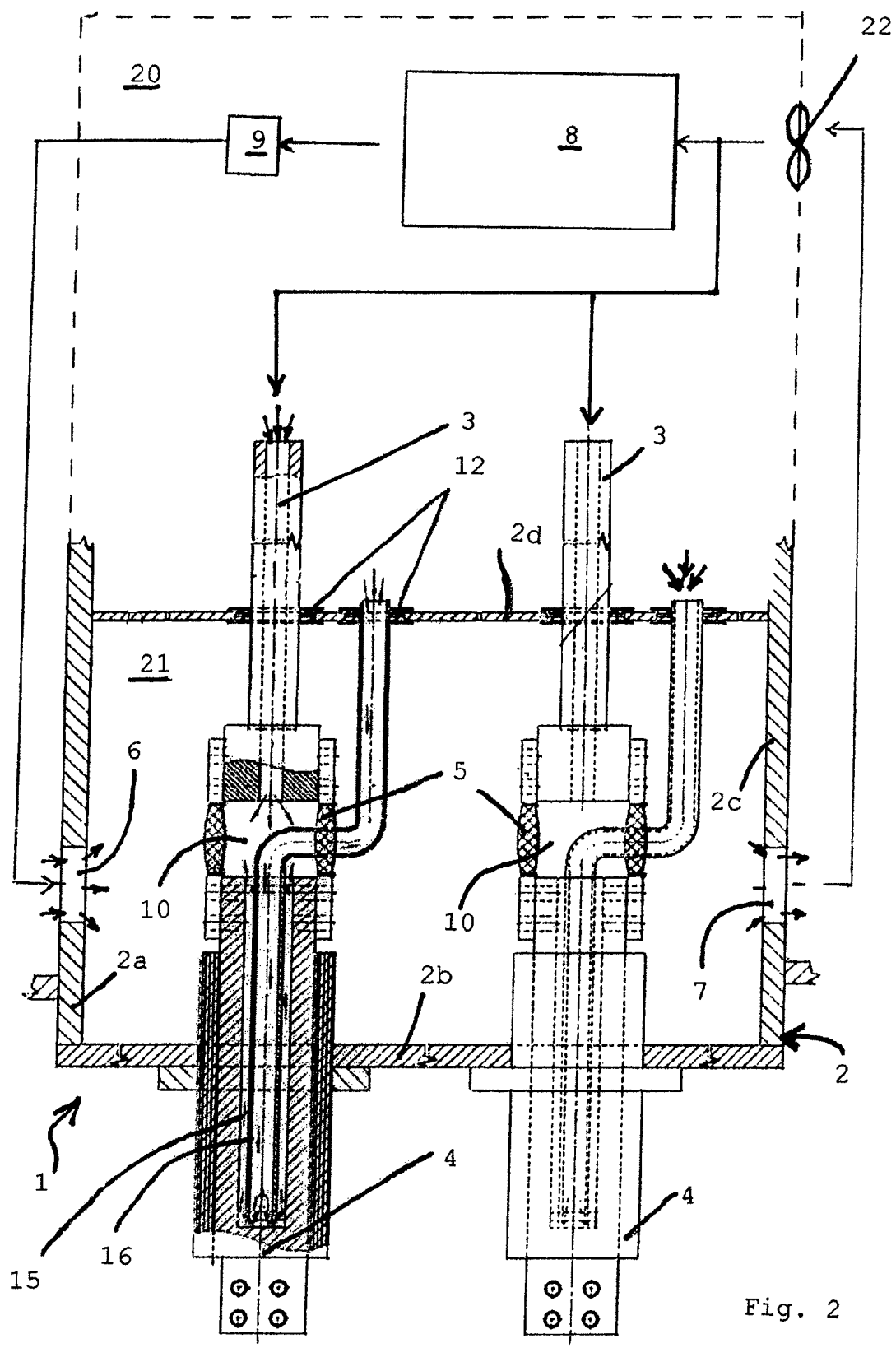
FIG. 2 is a schematic view of a second embodiment of the invention with parallel cooling of the lead conductor and bushing and outer cooling.

FIG. 2 shows a further different embodiment of the invention (parallel cooling).

This embodiment has the same features of the embodiment of FIG. 3 described and, in this respect, similar elements are indicated by the same reference numerals.

In addition, the bushings 4 have a passage 15 that opens in the chamber 10, for letting a cooling fluid pass through them to cool them.

The passage 15 is defined by a blind hole housing a guide 16 defining a double path passage.

The guide 16 is a tube housed along the whole length of the blind hole 15 with a gap between the end of the tube 16 and the bottom of the blind hole 15.

The tube 16 defines a path in its inner volume and a further path in the volume between its surface and the bushing blind hole surface.

The tube 16 is curved such that it passes through the permeable element 5 and also passes through the casing wall 2d and opens in the high pressure chamber 20 of the electrical machine.

The operation of the electrical connection in the embodiment of FIG. 2 is similar to that already described for the embodiment of FIG. 3.

Cooling fluid passes through the lead conductors 3 cooling them, enters the chambers 10 and passes through the permeable elements 5 cooling them.

In addition, cooling fluid (thanks to the differential pressure between the high pressure chamber 20 and the low pressure chamber 21) enters the tube 16 (from its end that opens in the high pressure chamber 20) and passes through the first path defined within the tube 16, passes through the gap and passes in counter flow through the second path defined between the tube 16 and the bushing 4 to cool the bushings.

The cooling fluid then enters the chamber 10 and passes through the permeable elements 5 cooling them.

The cooling fluid entering into the casing 2 and passing through the same casing 2 cools the outer surfaces of the lead conductors 3, the permeable elements 5 and the bushings 4 and, in addition, draws away the cooling fluid that comes from the permeable elements 5.

FIG. 1 shows a further different embodiment of the invention (sequential cooling).

This embodiment has the same features of the embodiment of FIG. 2 described and, in this respect; similar elements are indicated by the same references.

In this embodiment, the tube 16 (constituting the guide) is connected to the inner passage of the tubular lead conductor 3 and crosses the chamber 10.

The operation of the electrical connection in the embodiment of FIG. 1 is similar to that already described for the embodiment of FIG. 2.

Cooling fluid passes through the lead conductors 3 cooling them, then it enters the tubes 16 and passes through the two paths of the bushings 4 cooling them.

Then the cooling fluid enters the chamber 10 and passes through the permeable elements 5 cooling them.

The cooling fluid entering into the casing 2 and passing through the same casing 2 cools the lead outer surfaces of the conductors 3, the bushings 4 and the permeable elements 5 and, in addition, draws the cooling fluid that comes from the permeable element 5 away.

The present invention also refers to a method for cooling electrical connectors of a sealed electrical machine.

The method comprises routing the cooling fluid through the chamber 10 and the permeable element 5 to cool the permeable element 5.

Preferably the lead conductor 3 has a tubular shape and the cooling fluid passes through it, cooling it before entering the chamber 10.

Moreover, the bushing may have a passage such that the cooling fluid passes through it, cooling it before entering the chamber 10.

The electrical connection and the method conceived in this manner are susceptible to numerous modifications and variants, all falling within the scope of the inventive concept; moreover all details can be replaced by technically equivalent elements.

In practice the materials used and the dimensions can be chosen according to requirements and to the state of the art.

REFERENCE NUMERALS 1 electrical connection
2 casing
2a, 2b, 2c, 2d walls of the casing
3 lead conductor
4 bushing
5 electrical connector
6 inlet
7 outlet
8 stator
9 heat exchanger
10 chamber
12 seal
15 passage
16 guide
20 high pressure chamber
21 low pressure chamber
22 fan

What is claimed is:

1. Electrical connection of a sealed electrical machine comprising a casing having at least a lead conductor connected to at least one bushing via an electrical connector, wherein the casing comprises at least an inlet and an outlet for a cooling fluid, said electrical connector comprises at least a permeable element defining a chamber, such that, during operation, the cooling fluid passes through the chamber and the permeable element thereby cooling the permeable element, the at least one bushing comprising a passage which opens up in the chamber and is defined by a blind hole housing a guide having a gap between an end of the guide and a bottom of the blind hole such that the guide defines a path in its inner volume and a further path in a volume between its surface and a blind hole surface, wherein the guide passes through the permeable element.

2. The electrical connection as claimed in claim 1, wherein the permeable element defines said chamber with an end of the lead conductor and an end of the bushing.

3. The electrical connection as claimed in claim 1, wherein said casing has a box like structure comprising at least a through aperture through which said lead conductor passes for entering the casing.

4. The electrical connection as claimed in claim 3, wherein each aperture is provided with at least a seal arranged to seal the gap between the lead conductor and the casing.

5. The electrical connection as claimed in claim 1, wherein said inlet and said outlet are at opposite zones of the casing and are connected to a cooling circuit of the electrical machine.

6. The electrical connection as claimed in claim 1, wherein said lead conductor has a tubular shape and is arranged to feed a cooling fluid into the chamber, such that cooling fluid when passing through the permeable elements will cool it.

7. The electrical connection as claimed in claim 1, wherein the guide is a tube housed along the whole length of the blind hole with a gap between an end of the tube and a bottom of the blind hole, the tube defining a path in its inner volume and a further path in a volume between its surface and the bushing blind hole surface.

8. The electrical connection as claimed in claim 7, wherein the tube is connected to an inner passage of the tubular lead conductor and crosses the chamber, such that the cooling fluid cools the lead conductor, then cools the bushing and enters the chamber to be discharged through the permeable element.

9. The electrical connection as claimed in claim 7, wherein the tube passes through a casing wall and opens in a high pressure chamber of the electrical machine, such that the cooling fluid when passing through the lead conductor will cool the lead conductor and at the same time further cooling fluid will pass through the bushing and will cool the bushing, the cooling fluid coming from the lead conductor and the bushing then enters the chamber to be discharged through the permeable element.

10. Method for cooling electrical connectors of a sealed electrical machine which includes a casing having at least a lead conductor connected to a bushing via an electrical connector, the casing having at least an inlet and an outlet for a cooling fluid and the electrical connector includes at least a permeable element, which has a tubular conductive element provided with a plurality of through apertures and defines a chamber, the method comprising:

passing the cooling fluid, through the chamber and the permeable element, thereby cooling the permeable element, wherein the lead conductor comprises an inner passage, such that the cooling fluid enters the chamber through the inner passage, the electrical connector further comprises a guide which passes through the permeable element, the cooling fluid enters through the guide, then the same cooling fluid passes through the bushing, then the same cooling fluid enters the chamber.

11. The method as claimed in claim 10, wherein the lead conductor has a tubular shape and the cooling fluid passes therethrough, cooling it before entering the chamber.

12. The method as claimed in claim 11, wherein the bushing has a passage and the cooling fluid passes therethrough, cooling the bushing before entering the chamber.

13. Electrical connection of a sealed electrical machine comprising a casing having at least a lead conductor connected to a bushing via an electrical connector, wherein the casing comprises at least an inlet and an outlet for a cooling fluid, said electrical connector comprises at least a permeable element defining a chamber such that, during operation, the cooling fluid passes through the chamber and the permeable element thereby cooling the permeable element, said lead conductor has a tubular shape and comprises an inner passage and is arranged to feed a cooling fluid into the chamber, such that the cooling fluid when passing through the permeable elements will cool the lead conductor, the cooling fluid entering the chamber through the inner passage, the electrical connector further comprises a guide which passes through the permeable element, such that the cooling fluid will enter through the guide, then the same cooling fluid passes through the bushing, then the same cooling fluid will enter the chamber.

14. The electrical connection of claim 1, configured such that the cooling fluid will be discharged from the chamber through the permeable element during operation.

15. The method of claim 10, wherein the cooling fluid is discharged from the chamber through the permeable element.

16. The electrical connection of claim 13, configured such that the cooling fluid will be discharged from the chamber through the permeable element during operation.

17. The electrical connection as claimed in claim 1, wherein the lead conductor comprises an inner passage, such that the cooling fluid enters the chamber through the inner passage, the electrical connector further comprises a guide, the cooling fluid enters through the guide, then the same cooling fluid passes through the bushing, then the same cooling fluid enters the chamber.

* * * * *